United States Patent
Watanabe et al.

(10) Patent No.: US 11,184,543 B2
(45) Date of Patent: Nov. 23, 2021

(54) EXPOSURE SETTING APPARATUS, CONTROL METHOD THEREOF, AND STORAGE MEDIUM

(71) Applicant: CANON KABUSHIKI KAISHA, Tokyo (JP)

(72) Inventors: Kazuhiro Watanabe, Tokyo (JP); Mayu Asano, Tokyo (JP); Takeshi Kikkawa, Yokohama (JP); Takeshi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/988,203

(22) Filed: Aug. 7, 2020

(65) Prior Publication Data

US 2021/0044758 A1 Feb. 11, 2021

(30) Foreign Application Priority Data

Aug. 9, 2019 (JP) .............................. JP2019-147958

(51) Int. Cl.
*H04N 5/232* (2006.01)

(52) U.S. Cl.
CPC . *H04N 5/232939* (2018.08); *H04N 5/232933* (2018.08)

(58) Field of Classification Search
CPC ....... H04N 5/232939; H04N 5/232933; H04N 5/232935; H04N 5/23216; H04N 5/238; H04N 5/2352; H04N 5/23245
See application file for complete search history.

(56) References Cited

U.S. PATENT DOCUMENTS

| | | | | |
|---|---|---|---|---|
| 2009/0237548 A1* | 9/2009 | Watanabe | .......... | H04N 5/23216 348/333.02 |
| 2010/0296806 A1* | 11/2010 | Seo | ........................ | G03B 17/20 396/236 |
| 2016/0239195 A1* | 8/2016 | Takahashi | ............. | G06T 11/206 |
| 2018/0359425 A1* | 12/2018 | Hiro | ........................ | H04N 5/232 |
| 2020/0007756 A1* | 1/2020 | Tsuchiya | ............... | H04N 5/2352 |

FOREIGN PATENT DOCUMENTS

JP 2007-096682 A 4/2007

* cited by examiner

*Primary Examiner* — Timothy J Henn

(74) *Attorney, Agent, or Firm* — Cowan, Liebowitz & Latman P.C.

(57) ABSTRACT

There is provided an exposure setting apparatus. A display control unit performs control so that a coordinate system region which expresses a coordinate system including a first axis corresponding to an aperture value and a second axis corresponding to a shutter speed is displayed in a display unit. The display control unit performs control to add, to the coordinate system region, a visual gradation in which a tone value changes in the coordinate system region in a direction from a side where the aperture value is low and the shutter speed is slow to a side where the aperture value is high and the shutter speed is fast.

10 Claims, 13 Drawing Sheets

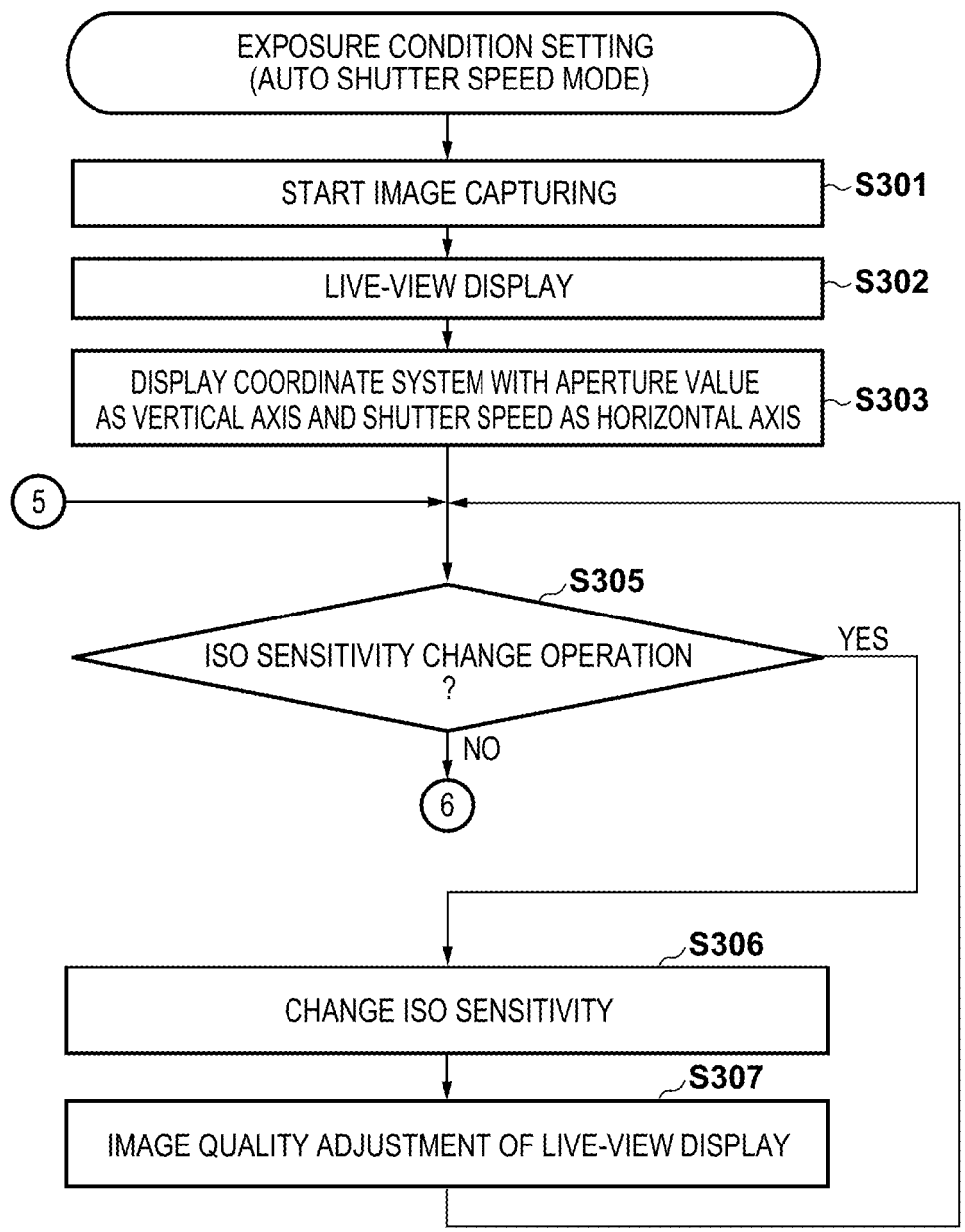

EXPOSURE SETTING APPARATUS, CONTROL METHOD THEREOF, AND STORAGE MEDIUM

BACKGROUND OF THE INVENTION

Field of the Invention

The present invention relates to an exposure setting apparatus, a control method thereof, and a storage medium.

Description of the Related Art

In a digital camera, control for appropriately setting the exposure at the time of capturing an image of a subject is performed in line with a so-called image capturing intent, that is to say, what kind of image a user wishes to capture. For example, the user selects a mode, such as an aperture priority mode and a shutter speed priority mode, and sets the aperture amount or the shutter speed in accordance with the selected mode. In a digital camera, along with the setting of the aperture amount or the shutter speed by the user, other setting values are decided on automatically, and the exposure is decided on based on these setting values.

However, there has been a problem that a user who is not familiar with image capturing cannot intuitively understand how other setting values change and the exposure is decided on as a result of changing a certain setting value in these modes, and the user has a hard time mastering the use. For example, in the shutter speed priority mode, if the shutter speed is reduced in line with an image capturing intent of producing a photograph showing the flowing water of a river, the aperture value is reduced (the aperture closes) and the depth of field increases in consequence; as a result, background blurring is difficult to achieve. There has been a problem that a user who is not familiar with image capturing cannot understand this relationship, and has a hard time setting a combination of the shutter speed, the aperture value, and the like (exposure conditions) that is just right for an image capturing intent.

Japanese Patent Laid-Open No. 2007-96682 discloses display of a graph with a horizontal axis representing the exposure period (shutter speed) and a vertical axis representing the aperture value, and presentation of a recommended setting region that achieves an appropriate exposure period and an appropriate aperture value on this graph. A user can input an appropriate exposure period and an appropriate aperture value by designating one point on the graph with reference to this recommended setting region.

However, with the technique disclosed in Japanese Patent Laid-Open No. 2007-96682, even if the user views a coordinate system region having two axes which correspond to the aperture value and shutter speed, respectively, it is not easy to intuitively understand the relationship which the aperture value and the shutter speed have with the exposure level (the brightness).

SUMMARY OF THE INVENTION

The present invention has been conceived in light of such circumstances. The present invention provides a technique which makes it possible for a user to intuitively understand a relationship which two exposure control parameters, such as aperture value and shutter speed, have with an exposure level (brightness) in a coordinate system region having two axes which correspond to the two exposure control parameters.

According to a first aspect of the present invention, there is provided an exposure setting apparatus comprising: a display control unit configured to perform control so that a coordinate system region which expresses a coordinate system including a first axis corresponding to an aperture value and a second axis corresponding to a shutter speed is displayed in a display unit, wherein the display control unit performs control to add, to the coordinate system region, a visual gradation in which a tone value changes in the coordinate system region in a direction from a side where the aperture value is low and the shutter speed is slow to a side where the aperture value is high and the shutter speed is fast.

According to a second aspect of the present invention, there is provided an exposure setting apparatus comprising: a display control unit configured to perform control so that a coordinate system region which expresses a coordinate system including a first axis corresponding to a first exposure control parameter and a second axis corresponding to a second exposure control parameter is displayed in a display unit, wherein the display control unit performs control to add, to the coordinate system region, a gradation which visually expresses a difference in exposure amount based on a difference in values of the first exposure control parameter and the second exposure control parameter at each position in the coordinate system region.

According to a third aspect of the present invention, there is provided a control method of an exposure setting apparatus, comprising: performing control so that a coordinate system region which expresses a coordinate system including a first axis corresponding to an aperture value and a second axis corresponding to a shutter speed is displayed in a display unit; and performing control to add, to the coordinate system region, a visual gradation in which a tone value changes in the coordinate system region in a direction from a side where the aperture value is low and the shutter speed is slow to a side where the aperture value is high and the shutter speed is fast.

According to a fourth aspect of the present invention, there is provided a control method of an exposure setting apparatus, comprising: performing control so that a coordinate system region which expresses a coordinate system including a first axis corresponding to a first exposure control parameter and a second axis corresponding to a second exposure control parameter is displayed in a display unit; and performing control to add, to the coordinate system region, a gradation which visually expresses a difference in exposure amount based on a difference in values of the first exposure control parameter and the second exposure control parameter at each position in the coordinate system region.

According to a fifth aspect of the present invention, there is provided a non-transitory computer-readable storage medium which stores a program for causing a computer to execute a control method comprising: performing control so that a coordinate system region which expresses a coordinate system including a first axis corresponding to an aperture value and a second axis corresponding to a shutter speed is displayed in a display unit; and performing control to add, to the coordinate system region, a visual gradation in which a tone value changes in the coordinate system region in a direction from a side where the aperture value is low and the shutter speed is slow to a side where the aperture value is high and the shutter speed is fast.

According to a sixth aspect of the present invention, there is provided a non-transitory computer-readable storage medium which stores a program for causing a computer to execute a control method comprising: performing control so that a coordinate system region which expresses a coordinate system including a first axis corresponding to a first exposure control parameter and a second axis corresponding to a second exposure control parameter is displayed in a display unit; and performing control to add, to the coordinate system region, a gradation which visually expresses a difference in exposure amount based on a difference in values of the first exposure control parameter and the second exposure control parameter at each position in the coordinate system region.

Further features of the present invention will become apparent from the following description of exemplary embodiments with reference to the attached drawings.

BRIEF DESCRIPTION OF THE DRAWINGS

FIGS. 7A to 7C are flowcharts illustrating a flow of setting exposure conditions in an auto shutter speed mode.

DESCRIPTION OF THE EMBODIMENTS

Figure 1:
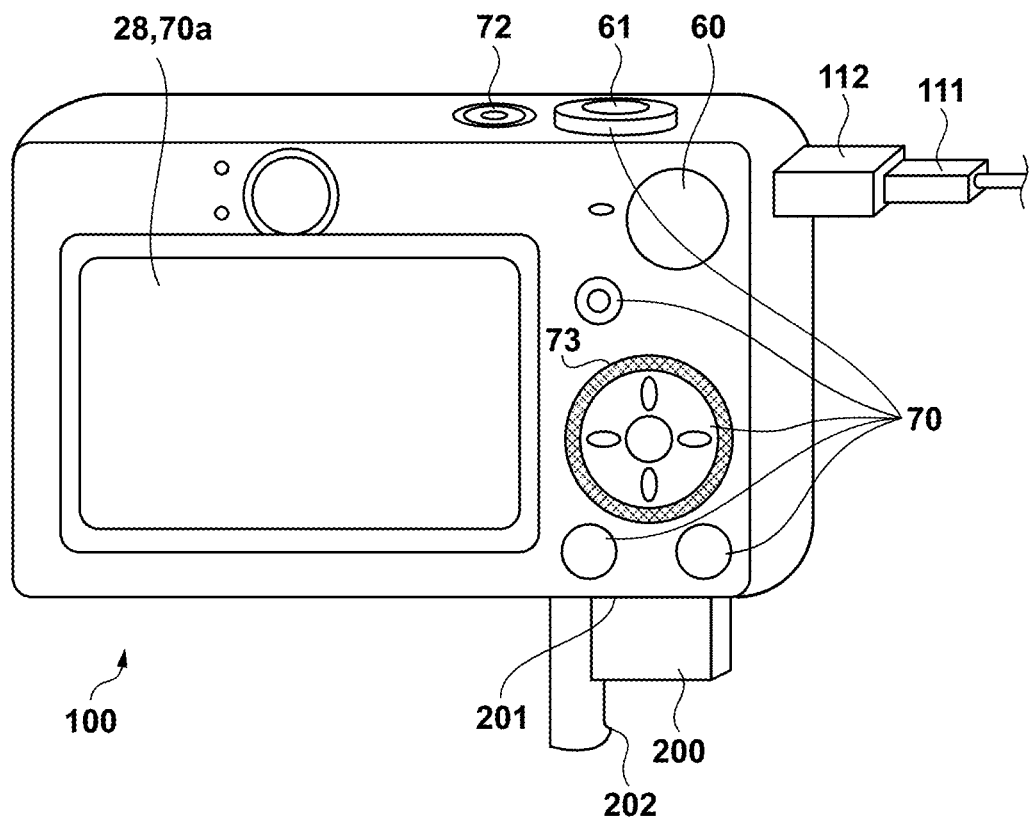
FIG. 1 is an external view of a digital camera 100.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 shows an external view of a digital camera 100 that serves as an example of an exposure setting apparatus (electronic device) to which the present invention can be applied. A display unit 28 is a display unit that displays images and various types of information. A shutter button 61 is an operation unit for issuing a shooting instruction. A mode changing switch 60 is an operation unit for switching among various types of modes. A connector 112 is a connector between a connection cable 111, which is intended to establish connection with an external device, such as a personal computer and a printer, and the digital camera 100. An operation unit 70 is an operation unit that is composed of such operation members as various types of switches, buttons, and a touch panel that accept various types of operations from a user. A controller wheel 73 is an operation member that is included in the operation unit 70 and can be operated by rotation. A power switch 72 is a push button for switching between power-ON and power-OFF. A recording medium 200 is a recording medium, such as a memory card and a hard disk. A recording medium slot 201 is a slot for storing the recording medium 200. The recording medium 200 stored in the recording medium slot 201 can communicate with the digital camera 100, and can perform recording and reproduction. A cover 202 is a cover for the recording medium slot 201. FIG. 1 shows a state in which the cover 202 is open, and a part of the recording medium 200 has been extracted from the recording medium slot 201 and is exposed.

Figure 2:
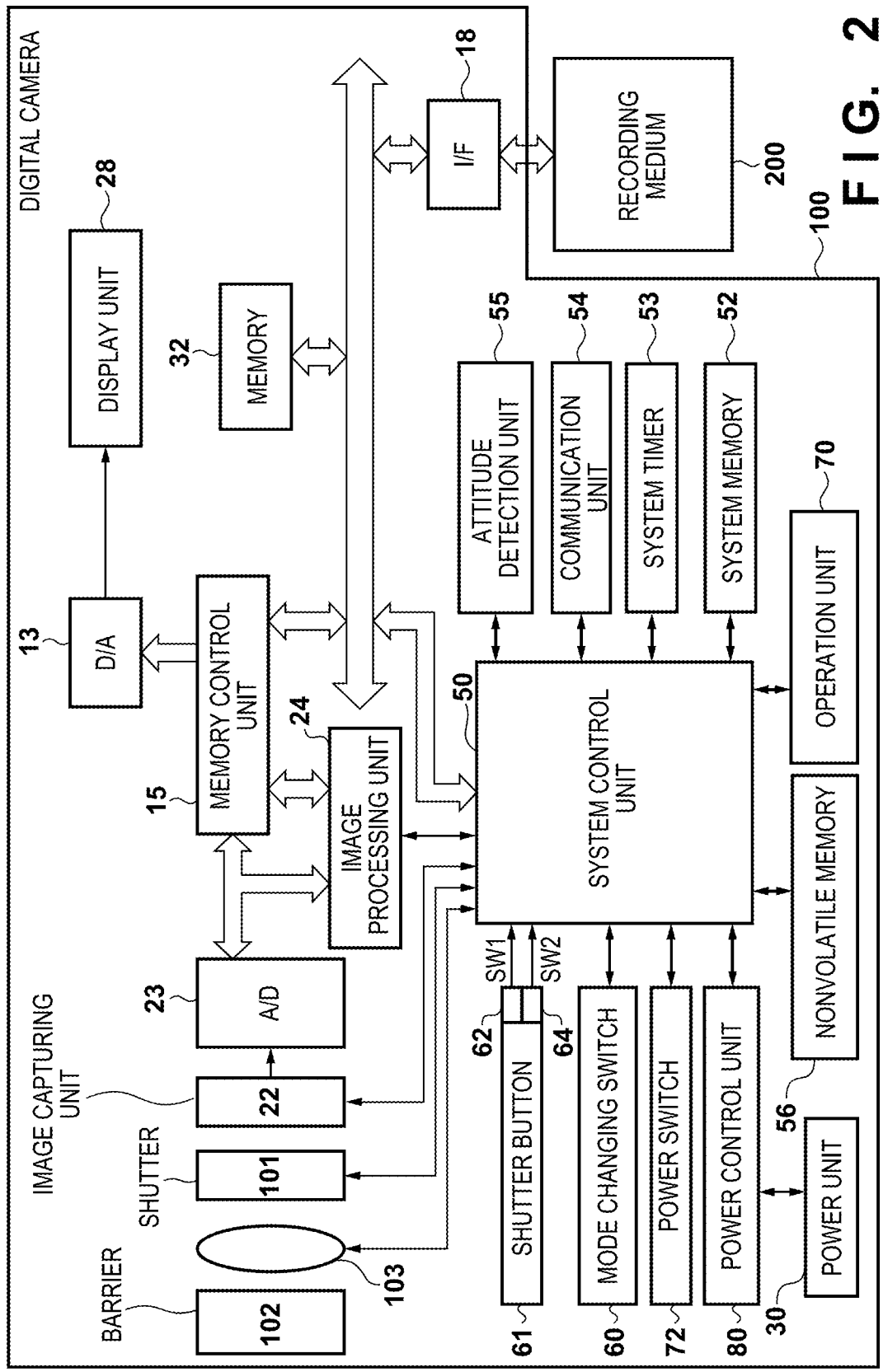
FIG. 2 is a block diagram showing an exemplary configuration of the digital camera 100.

FIG. 2 is a block diagram showing an exemplary configuration of the digital camera 100 according to the present embodiment. In FIG. 2, a photographing lens 103 is a lens group including a zoom lens and a focusing lens. A shutter 101 is a shutter with an aperture function. An image capturing unit 22 is an image sensor composed of, for example, a CCD or CMOS sensor that converts an optical image into an electrical signal. An A/D converter 23 converts an analog signal into a digital signal. The A/D converter 23 is used to convert an analog signal output from the image capturing unit 22 into a digital signal. A barrier 102 covers an image capturing system of the digital camera 100, including the photographing lens 103, so as to prevent the image capturing system including the photographing lens 103, the shutter 101, and the image capturing unit 22 from being soiled or damaged.

An image processing unit 24 performs predetermined pixel interpolation, resizing (e.g., reduction) processing, and color conversion processing with respect to data from the A/D converter 23 or data from a memory control unit 15. The image processing unit 24 also performs predetermined computational processing using captured image data. Based on the computational result obtained by the image processing unit 24, a system control unit 50 performs exposure control and range-finding control. As a result, TTL (through-the-lens) AF (autofocus) processing, AE (automatic exposure) processing, and EF (preliminary flash emission) processing are performed. Furthermore, the image processing unit 24 performs predetermined computational processing using captured image data, and performs TTL AWB (auto white balance) processing based on the obtained computational result.

Output data from the A/D converter 23 is written directly into a memory 32 via the image processing unit 24 and the memory control unit 15, or via the memory control unit 15. The memory 32 stores image data that has been obtained by the image capturing unit 22 and converted into digital data by the A/D converter 23, and image data to be displayed on the display unit 28. The memory 32 has a storage capacity sufficient to store a predetermined number of still images, as well as moving images and audio of a predetermined duration.

The memory 32 also functions as a memory for image display (video memory). A D/A converter 13 converts data for image display stored in the memory 32 into an analog signal, and supplies the analog signal to the display unit 28. In this way, image data for display that has been written into the memory 32 is displayed by the display unit 28 via the D/A converter 13. The display unit 28 performs display on a display device, such as an LCD, in accordance with an analog signal from the D/A converter 13. Digital signals that have undergone the A/D conversion in the A/D converter 23 and have been accumulated in the memory 32 are converted into analog signals in the D/A converter 13, and then the analog signals are sequentially transferred to and displayed on the display unit 28; in this way, the display unit 28 functions as an electronic viewfinder and can display through-the-lens images. Display of through-the-lens images is also referred to as live-view display (LV display). Hereinafter, images that are displayed in the form of live-view are referred to as live-view images (LV images).

A nonvolatile memory 56 is a memory that serves as an electrically erasable and recordable recording medium; for example, an EEPROM or the like is used thereas. For example, constants and programs for the operations of the system control unit 50 are stored in the nonvolatile memory 56. The programs mentioned here refer to computer programs for executing various types of flowcharts, which will be described later, in the present embodiment.

The system control unit 50 is a control unit that includes at least one processor or circuit, and controls the entirety of the digital camera 100. The system control unit 50 realizes each processing of the present embodiment, which will be described later, by executing a program recorded in the nonvolatile memory 56 mentioned earlier. For example, a RAM is used as a system memory 52. Constants and variables for the operations of the system control unit 50, programs that have been read out from the nonvolatile memory 56, and the like are deployed to the system memory 52. The system control unit 50 also performs display control by controlling the memory 32, the D/A converter 13, the display unit 28, and the like.

A system timer 53 is a time measurement unit that measures the times used in various types of control and the time of a built-in clock.

The mode changing switch 60, the shutter button 61, and the operation unit 70 are operation units for inputting various types of operational instructions to the system control unit 50. The mode changing switch 60 switches an operation mode of the system control unit 50 to one of a still image recording mode, a moving image shooting mode, a reproduction mode, and so on.

Examples of modes included in the still image recording mode are an auto shooting mode, an auto scene distinction mode, a manual mode, an aperture priority mode (Av mode), a shutter speed priority mode (Tv mode), and a program AE mode. Other examples are various types of scene modes in which shooting settings are configured separately for each shooting scene, and a custom mode. Using the mode changing switch 60, the user can switch directly to one of these modes. Alternatively, it is permissible to first switch to a shooting mode list screen using the mode changing switch 60, and then select one of a plurality of modes that have been displayed and switch thereto using another operation member. Likewise, the moving image shooting mode may also include a plurality of modes.

A first shutter switch 62 is turned ON and generates a first shutter switch signal SW1 partway through an operation performed on the shutter button 61 provided in the digital camera 100, that is to say, when the button is depressed halfway (a shooting preparation instruction). In response to the first shutter switch signal SW1, the system control unit 50 starts the operations of AF (autofocus) processing, AE (automatic exposure) processing, AWB (auto white balance) processing, EF (preliminary flash emission) processing, and the like.

A second shutter switch 64 is turned ON and generates a second shutter switch signal SW2 upon completion of the operation performed on the shutter button 61, that is to say, when the button is fully depressed (a shooting instruction). In response to the second shutter switch signal SW2, the system control unit 50 starts a series of operations of shooting processing, from reading of signals from the image capturing unit 22 to writing of image data into the recording medium 200.

For example, performing an operation of selecting various types of function icons displayed on the display unit 28 will assign functions to the respective operation members of the operation unit 70 as appropriate on a scene-by-scene basis; as a result, the respective operation members act as various types of function buttons. Examples of the function buttons include an end button, a return button, a next image button, a jump button, a refinement button, an attribute change button, and so on. For example, when a menu button is pressed, a menu screen on which various types of settings can be configured is displayed on the display unit 28. The user can configure various types of settings intuitively using the menu screen displayed on the display unit 28, four directional buttons corresponding to up, down, left, and right, and a SET button.

The controller wheel 73 is an operation member that is included in the operation unit 70 and can be operated by rotation, and is used together with the directional buttons to, for example, issue an instruction regarding an item to be selected. When the controller wheel 73 is operated by rotation, an electrical pulse signal is generated in accordance with the amount of operation, and the system control unit 50 controls each component of the digital camera 100 based on this pulse signal. The angle by which the controller wheel 73 has been operated by rotation, how many times it has been rotated, and the like can be determined using this pulse signal. Note that the controller wheel 73 may be any operation member as long as the rotational operation can be detected. For example, it may be a dial operation member that allows the controller wheel 73 itself to rotate to generate the pulse signal in accordance with the rotational operation performed by the user. Furthermore, it may be an operation member which is composed of a touch sensor, and which does not allow the controller wheel 73 itself to rotate but detects a rotating motion and the like of the user's finger on the controller wheel 73 (a so-called touch wheel).

A power control unit 80 is composed of, for example, a battery detection circuit, a DC-DC converter, and a switch circuit for switching among the blocks to which electric current is supplied, and detects whether a battery is loaded, the battery type, and the remaining battery power. The power control unit 80 also controls the DC-DC converter based on the results of such detection and an instruction from the system control unit 50, and supplies a necessary voltage for a necessary period to the respective components of the digital camera 100, including the recording medium 200. A power unit 30 is composed of a primary battery (e.g., an alkaline battery and a lithium battery), a secondary battery (e.g., a NiCd battery, a NiMH battery, and a lithium-ion battery), an AC adapter, or the like.

A recording medium I/F 18 is an interface with the recording medium 200, which is a memory card, a hard disk, or the like. The recording medium 200 is a recording medium, such as a memory card, for recording shot images, and is composed of a semiconductor memory, an optical disc, a magnetic disk, or the like.

A communication unit 54 connects to an external device wirelessly or via a wired cable, and transmits and receives video signals, audio signals, and the like. The communication unit 54 can also connect to a wireless LAN (Local Area Network) and the Internet. Furthermore, the communication unit 54 can communicate with an external device also via Bluetooth® and Bluetooth Low Energy. The communication unit 54 can transmit images captured by the image capturing unit 22 (including LV images) and images recorded in the recording medium 200, and can also receive image data and other various types of information from an external device.

An attitude detection unit 55 detects the attitude of the digital camera 100 relative to the gravitational direction. Whether an image shot by the image capturing unit 22 is an image that was shot with the digital camera 100 held horizontally or an image that was shot with the digital camera 100 held vertically can be distinguished based on the attitude detected by the attitude detection unit 55. The system control unit 50 can add orientation information corresponding to the attitude detected by the attitude detection unit 55 to an image file of images captured by the image capturing unit 22, record images in a rotated state, and so on. An acceleration sensor, a gyro sensor, or the like can be used as the attitude detection unit 55. It is also possible to detect a motion of the digital camera 100 (e.g., whether the digital camera 100 is panning, tilting, lifted, or stationary) using the acceleration sensor or the gyro sensor serving as the attitude detection unit 55.

Note that the digital camera 100 includes, as a part of the operation unit 70, a touch panel 70a that is capable of detecting contact with the display unit 28. As shown in FIG. 1, the touch panel 70a and the display unit 28 can be configured as an integrated unit. For example, the touch panel 70a is configured to have a light transmittance that does not interfere with display of the display unit 28, and is attached to the top layer of the display surface of the display unit 28. Then, input coordinates of the touch panel 70a are associated with display coordinates on a display screen of the display unit 28. This makes it possible to provide a GUI (graphical user interface) in which the user seems capable of directly manipulating a screen displayed on the display unit 28. The system control unit 50 can detect the following operations or states with respect to the touch panel 70a.

Newly touching the touch panel 70a with a finger or a stylus that had not been touching the touch panel 70a. In other words, this is the start of a touch (hereinafter referred to as a "touch-down").

A state in which a finger or a stylus is touching the touch panel 70a (hereinafter referred to as a "touch-on").

Moving a finger or a stylus while it is touching the touch panel 70a (hereinafter referred to as a "touch-move").

Releasing a finger or a stylus that had been touching the touch panel 70a therefrom. In other words, this is the end of a touch (hereinafter referred to as a "touch-up").

A state in which nothing is touching the touch panel 70a (hereinafter referred to as a "touch-off").

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or styluses that had been touching.

These operations/states, as well as the positional coordinates on the touch panel 70a where a finger or a stylus is touching, are communicated to the system control unit 50 through an internal bus. The system control unit 50 determines what type of operation (touch operation) has been made on the touch panel 70a based on the communicated information. With respect to a touch-move, the moving direction of a finger or a stylus moving on the touch panel 70a can also be determined, based on changes in the positional coordinates, for each of a vertical component and a horizontal component on the touch panel 70a.

It is assumed that when a touch-move of a predetermined distance or longer has been detected, it is determined that a slide operation has been performed. An operation of rapidly moving a finger by a certain distance while the finger is touching the touch panel 70a and then releasing the finger therefrom is called a flick. In other words, a flick is a rapid tracing operation in which the touch panel 70a is flicked with a finger. When a touch-up is detected directly after detection of a touch-move of a predetermined distance or longer and a predetermined speed or higher, it can be determined that a flick has been performed (it can be determined that a flick has been performed following a slide operation). Furthermore, in a case where a plurality of locations (e.g., two points) are touched at the same time, a touch operation of moving the touched positions closer to each other is called a "pinch-in", whereas a touch operation of moving the touched positions apart from each other is called a "pinch-out". A pinch-out and a pinch-in are collectively referred to as pinch operations (or simply "pinch").

Any of a variety of types of touch panels, such as a resistive film type, a capacitance type, a surface acoustic wave type, an infrared type, an electromagnetic induction type, an image recognition type, and an optical sensor type, may be used as the touch panel 70a. Depending on the type, a touch is detected when contact is made with the touch panel, or a touch is detected when a finger or a stylus has approached the touch panel; either of these types may be used.

Below is a detailed description of the setting of exposure conditions using the exposure setting apparatus (digital camera 100) of FIG. 1. First, a description is given of a case where the aperture value, the shutter speed, and the ISO sensitivity can be changed respectively and independently, such as a case where the so-called "manual mode" (first operation mode) is set as an image capturing mode.

Figure 3A:
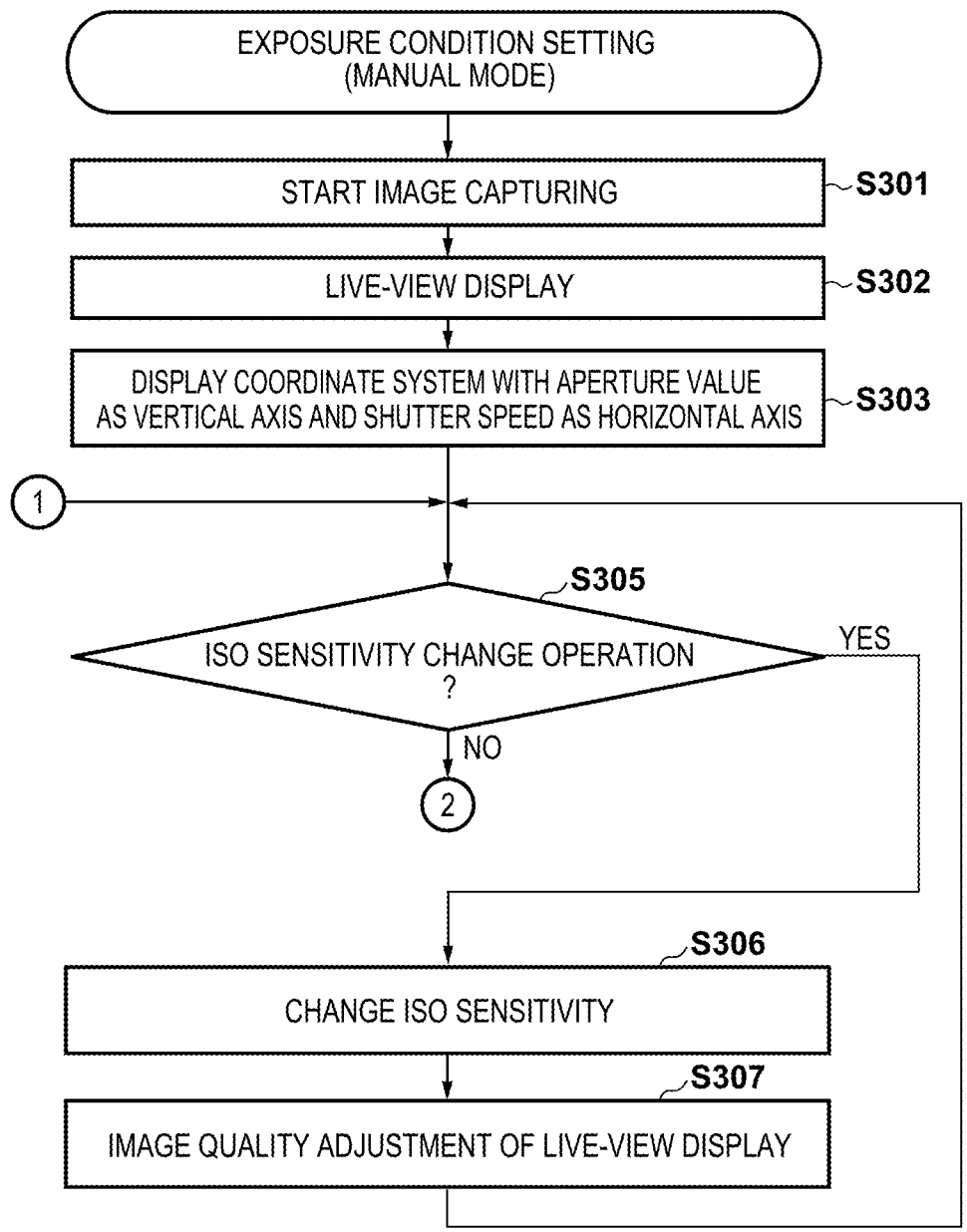
FIGS. 3A to 3C are flowcharts showing the flow of the setting of exposure conditions in a manual mode.
Figure 3B:
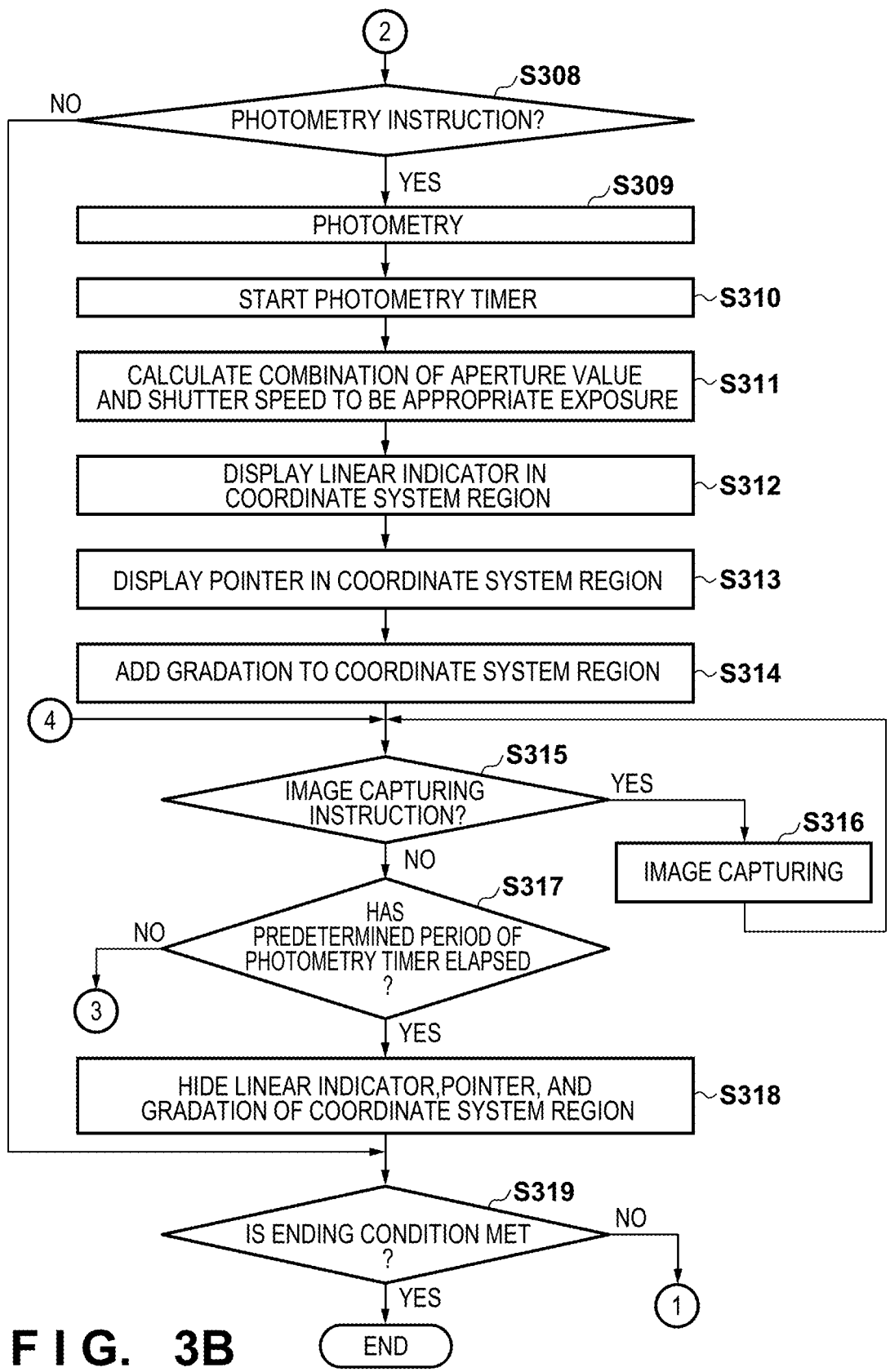
Figure 3C:
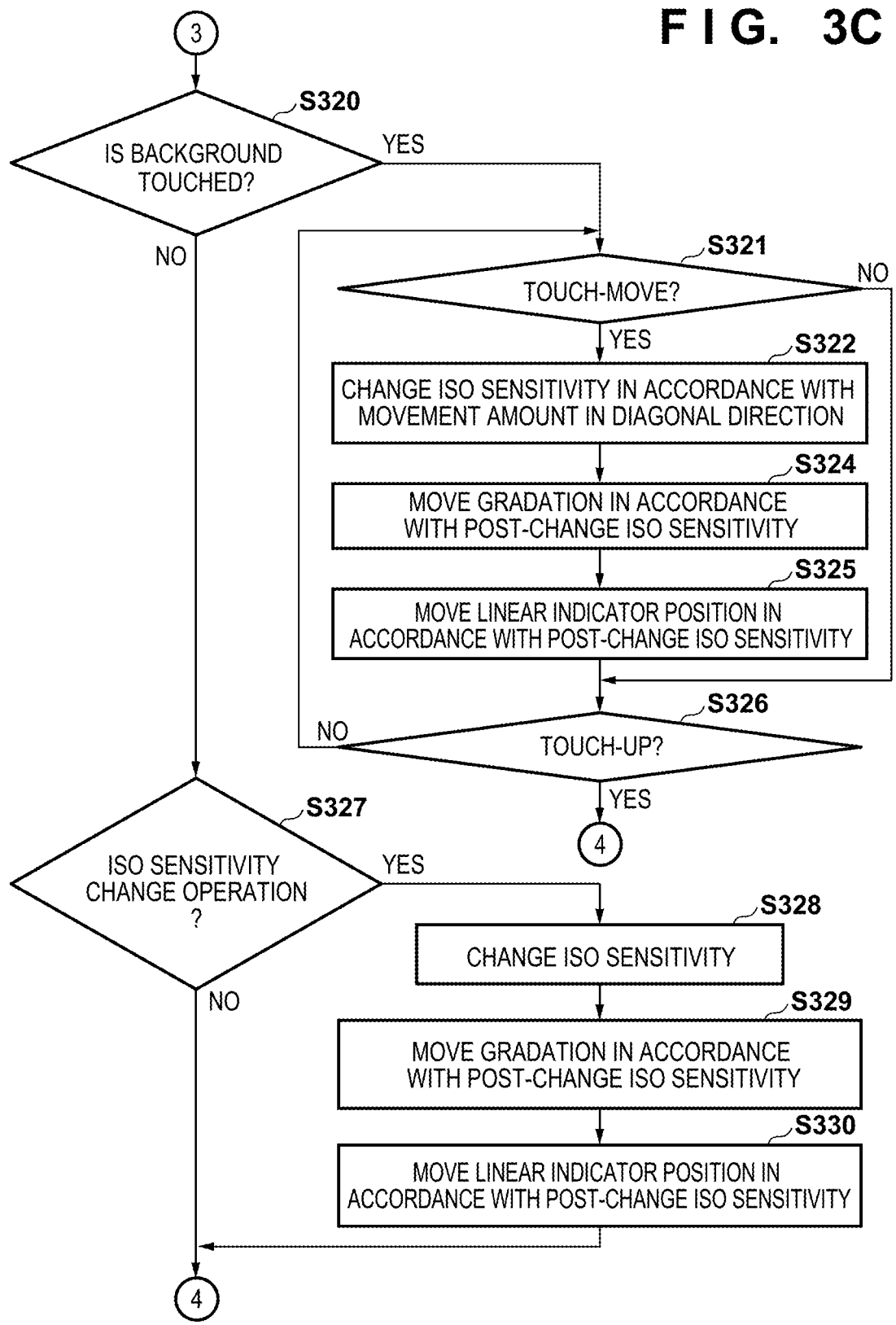

FIGS. 3A to 3C are a flowchart showing the flow of the setting of exposure conditions in the manual mode using the exposure setting apparatus (digital camera 100) of FIG. 1. Processing of respective steps of the present flowchart is realized as the system control unit 50 of the digital camera 100 deploys a processing program recorded in the nonvolatile memory 56 to the system memory 52 and executing the processing program, unless specifically stated otherwise. Processing of the present flowchart is started when a user turns ON the power of the digital camera 100 and sets the manual mode as the image capturing mode.

In step S301, the system control unit 50 starts image capturing for LV display under predetermined image capturing setting conditions, for example, predetermined focus, exposure, white balance, aperture value, shutter speed, and ISO sensitivity. For example, various types of conditions that were set before the power was turned OFF are restored and used as the predetermined image capturing setting conditions; this, however, depends on the specification of the digital camera 100.

In step S302, the system control unit 50 performs LV display by displaying the video that is being captured by the image capturing unit 22 on the display unit 28 (touch display).

Figure 4A:
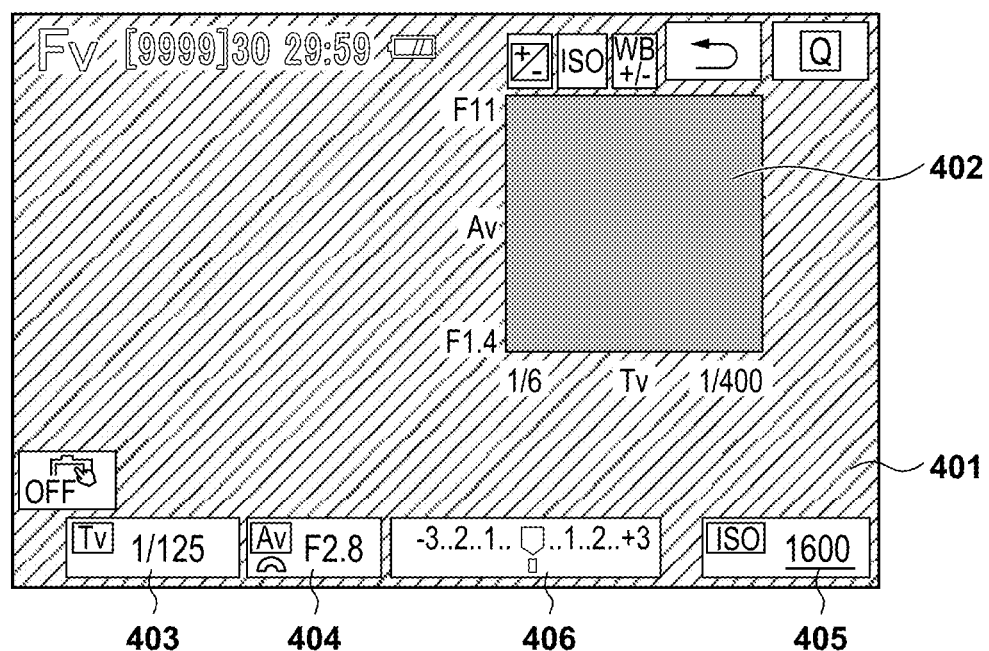
FIG. 4A is a diagram illustrating a screen displayed in a display unit 28 in step S303.

In step S303, the system control unit 50 displays, in the display unit 28 (the touch display), a coordinate system in which the vertical axis represents the aperture value and the horizontal axis represents the shutter speed. FIG. 4A illustrates a screen displayed in the display unit 28 in step S303. 401 indicates a live view display, 402 indicates a coordinate system region, 403 indicates a shutter speed display, 404 indicates an aperture display, 405 indicates an ISO sensitivity display, and 406 indicates an exposure level display. Note that the numbers or scale positions indicated by reference numerals 403, 404, 405, and 406 are merely examples for illustrating the appearances thereof, are do not express actual numerical values used in the embodiments.

In step S305, the system control unit 50 determines whether or not the user has performed an operation for changing the ISO sensitivity using a predetermined operating member in the operating unit 70. If it is determined that an operation for changing the ISO sensitivity has been made, the sequence moves to step S306, and if not, the sequence moves to step S308. The "predetermined operating member" mentioned here is, for example, a button, a control wheel, a combination of the two, or the like. For example, an operation in which the user rotates the control wheel while holding down a predetermined button can be interpreted as an operation for changing the ISO sensitivity.

In step S306, the system control unit 50 changes the ISO sensitivity setting value in accordance with the content of the operation for changing the ISO sensitivity (e.g., a direction in and amount by which the predetermined operating member has been operated). Here, the "ISO sensitivity setting value" refers to the setting value used for main shooting. The ISO sensitivity value used for LV display image capturing is not necessarily identical to the setting value used for main shooting. In the following descriptions, a "setting value" mentioned with respect to exposure control parameters such as the aperture value, the shutter speed, and the ISO sensitivity is assumed to refer to the value set as a value for the exposure control parameters used in main shooting. The system control unit 50 can obtain the setting values of the exposure control parameters used in the previous instance of main shooting as the initial (e.g., at the start of the processing illustrated in the flowchart of FIG. 3A) setting values for the exposure control parameters, from the nonvolatile memory 56, for example.

In step S307, the system control unit 50 adjusts the display quality of the live view display so that the live view is displayed with good visibility, even when using the changed ISO sensitivity. The sequence then returns to step S304.

On the other hand, in step S308, the system control unit 50 determines whether a photometry instruction has been made as a result of, for example, the user pressing the shutter button 61 halfway (an image capturing preparation instruction). If it is determined that a photometry instruction has been made, the sequence moves to step S309, and if not, the sequence moves to step S319.

In step S309, the system control unit 50 performs photometry for measuring the brightness of the subject (subject luminance). In step S310, the system control unit 50 starts a photometry timer T1. The photometry timer T1 is a timer for measuring the time for which to continue photometry for a predetermined amount of time following the photometry instruction.

In step S311, the system control unit 50 uses a known AE (automatic exposure) processing algorithm to calculate a plurality of combinations of aperture value and shutter speed corresponding to a proper exposure determined on the basis of the ISO sensitivity setting value and the subject luminance.

In step S312, the system control unit 50 displays a line segment, which corresponds to the plurality of combinations calculated in step S311, as a linear indicator in the coordinate system region 402. In step S313, the system control unit 50 displays, in the coordinate system region 402, a pointer in a position corresponding to the current combination of setting values for the aperture value and the shutter speed. In step S314, the system control unit 50 adds, to the coordinate system region 402, a visual gradation in which a tone value changes in the coordinate system region 402 in the direction from the side where the aperture value is low and the shutter speed is slow to the side where the aperture value is high and the shutter speed is fast.

Figure 4B:
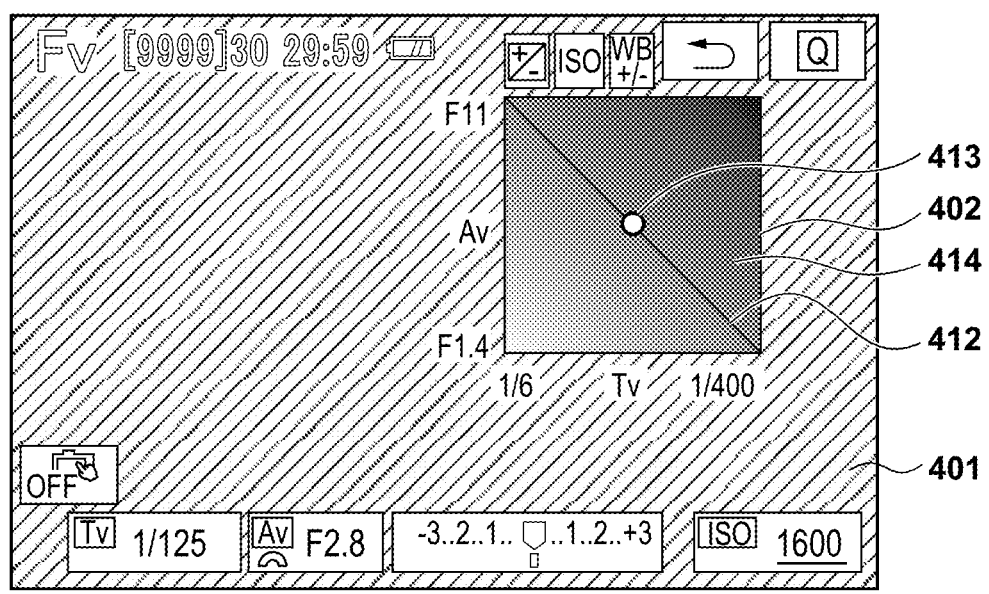
FIG. 4B is a diagram illustrating a screen displayed in the display unit 28 through the processing from steps S312 to S314.

FIG. 4B illustrates a screen displayed in the display unit 28 through the processing from steps S312 to S314. 412 indicates the linear indicator, 413 indicates the pointer, and 414 indicates the gradation. In the example illustrated in FIG. 4B, the background of the coordinate system region 402 (the gradation 414 added to the coordinate system region 402) is expressed with a tone change in which the brightness of an achromatic gray color darkens toward the upper-right and lightens toward the lower-left. This is done to provide an effect of enabling the user to intuitively understand that the exposure level decreases (becomes darker) as the pointer 413 moves closer to the upper-right of the coordinate system region 402 and increases (becomes lighter) as the pointer 413 moves to the lower-left of the coordinate system region 402. As illustrated in FIG. 4B, the gradation 414 is configured so that the tone values are substantially identical for coordinates of combinations of aperture value and shutter speed at which the exposure level is the same, but it is not necessary to employ this exact configuration.

Note that on the basis of the ISO sensitivity setting value and the subject luminance, the system control unit 50 may determine a correspondence relationship which a tone value in the gradation 414 has with the aperture value and the shutter speed. In this case, the user can more accurately understand the relationship which the aperture value and shutter speed have with the exposure level (brightness). For example, the system control unit 50 may express a position in the coordinate system region 402 corresponding to the proper exposure determined on the basis of the ISO sensitivity setting value and the subject luminance (i.e., a position of the linear indicator 412) as a tone value which is approximately 50% of the gradation 414 (a half-tone). In this case, the user can more intuitively understand the position of the proper exposure.

Note that the linear indicator 412 (a first indicator) may be a line with a width, may include curves or polygonal lines, may be given a pattern, and so on. The pointer 413 (a second indicator) may be given a graphic, a pattern, or the like as well. In the example illustrated in FIG. 4B, the linear indicator 412 is a continuous line segment, and thus has an appearance of connecting the positions, in the coordinate system region 402, of the plurality of combinations of the aperture value and shutter speed corresponding to the proper exposure. However, instead of an indicator that connects these positions, discrete (non-continuous) indices which do not connect these positions may be used.

In step S315, the system control unit 50 determines whether an image capturing instruction has been made by the user pressing the shutter button 61 or the like. If it is determined that an image capturing instruction has been made, the sequence moves to step S316, and if not, the sequence moves to step S317.

In step S316, the system control unit 50 captures an image using the current setting values for the aperture value, the shutter speed, and the ISO sensitivity.

In step S317, the system control unit 50 determines whether the photometry timer T1 has passed a predetermined amount of time. If it is determined that the predetermined amount of time has passed, the sequence moves to step S318, and if not, the sequence moves to step S320.

In step S318, the system control unit 50 hides the linear indicator 412, the pointer 413, and the gradation 414 in the coordinate system region 402. In step S319, the system control unit 50 determines whether an end condition, such as the power being turned off, is satisfied. If it is determined that the end condition is satisfied, the sequence of the flowchart ends, and if not, the sequence returns to step S305.

If in step S317 it is determined that the photometry timer T1 has not passed the predetermined amount of time, in step S320, the system control unit 50 determines whether the background of the coordinate system region 402 (the gradation 414) has been touched by the user. If it is determined that the background has been touched by the user, the sequence moves to step S321, and if not, the sequence moves to step S327.

In step S321, the system control unit 50 determines whether the user has performed a touch-move. If it is determined that the user has performed a touch-move, the sequence moves to step S322, and if not, the sequence moves to step S326.

In step S322, the system control unit 50 changes the ISO sensitivity setting value in accordance with the movement amount of the touch-move (a slide operation) in a diagonal direction (the direction in which the tone value changes in the gradation 414). To be more specific, if the slide operation of the touch has a movement component progressing toward the lower-left side (the side of the coordinate system region 402 where the aperture value is low and the shutter speed is slow), the system control unit 50 reduces the ISO sensitivity setting value. On the other hand, if the slide operation of the touch has a movement component progressing toward the upper-right side (the side of the coordinate system region 402 where the aperture value is high and the shutter speed is fast), the system control unit 50 increases the ISO sensitivity setting value.

In step S324, the system control unit 50 moves the gradation 414 in accordance with the post-change ISO sensitivity setting value. In step S325, the system control unit 50 moves the display position of the linear indicator 412 in accordance with the post-change ISO sensitivity setting value.

Figure 5A:
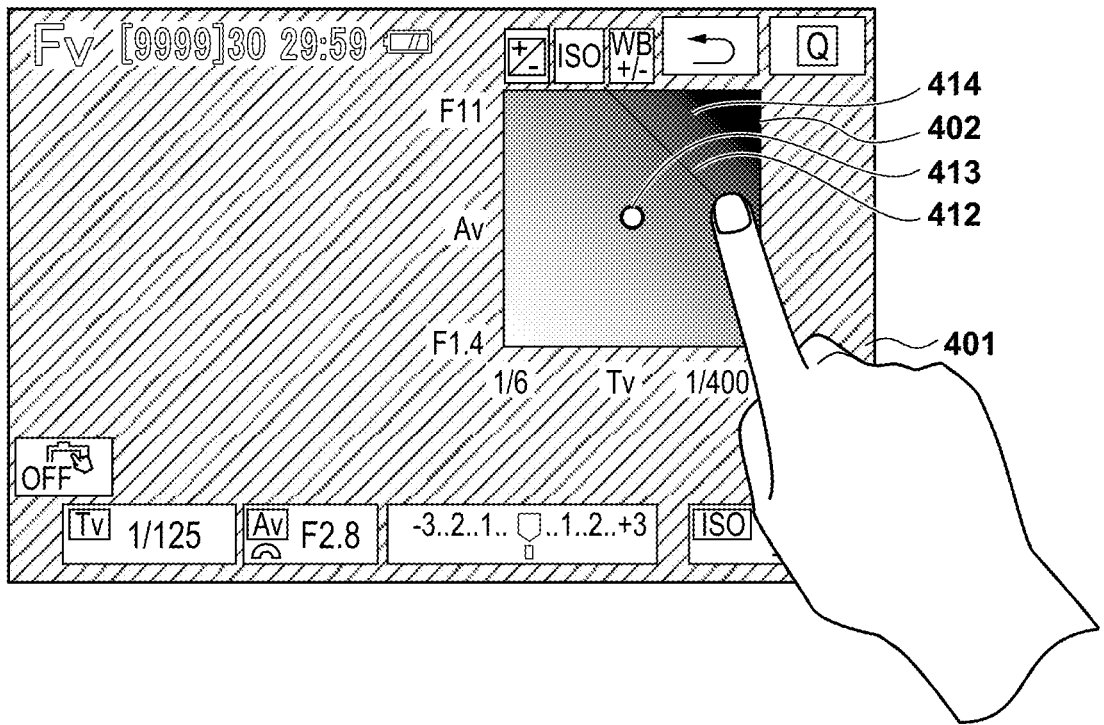
FIG. 5A is a diagram illustrating a screen displayed in the display unit 28 through the processing of steps S324 and S325.

FIG. 5A illustrates a screen displayed in the display unit 28 through the processing of steps S324 and S325, and corresponds to a result of the user performing an operation for changing the ISO sensitivity by performing a touch-move in the gradation 414. In this case, the position of the pointer 413 does not move, and thus the brightness of the background changes at the position of the pointer 413. Accordingly, the user can intuitively understand that the exposure level changes due to the ISO sensitivity being changed.

A situation where the user performs an operation for changing the ISO sensitivity in the manual mode is a situation where the user changes only the exposure level, without changing the aperture value (depth of field) or shutter speed, in order to take a photo in which, for example, the water of a river is flowing with a desired background blurriness. In such a situation, the user can graphically confirm that (although the exposure level will change) the shutter speed and aperture value will not change in response to the ISO sensitivity being changed, and the user can therefore perform operations for setting the exposure with peace of mind.

Figure 5B:
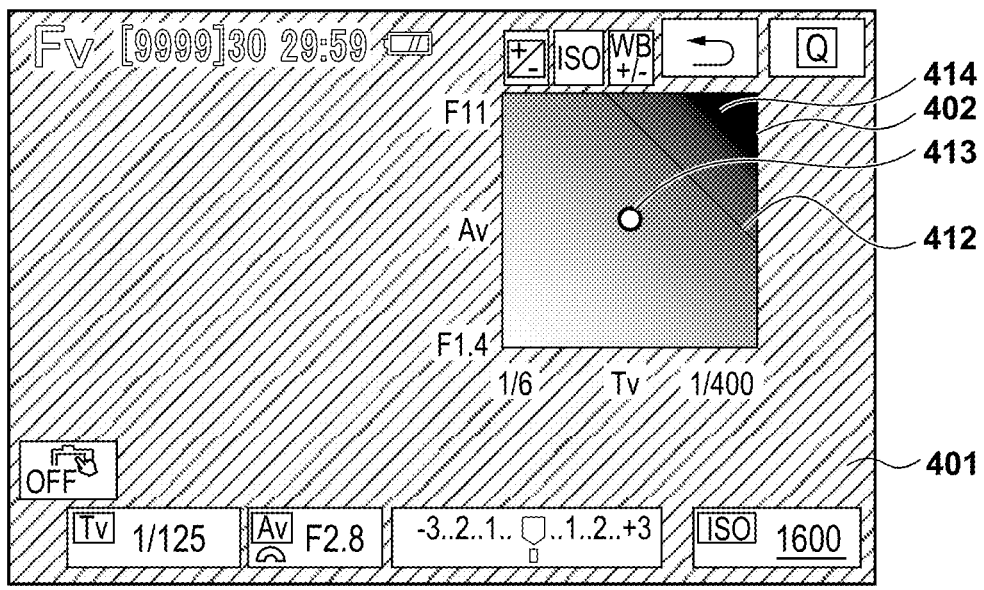
FIG. 5B is a diagram illustrating a screen displayed in the display unit 28 through the processing of steps S329 and S330.

Note that the example illustrated in FIG. 5A corresponds to a case where the ISO sensitivity setting value has been changed so as to increase, and thus the gradation 414 has moved toward the upper-right, as compared to FIG. 5B. However, if the ISO sensitivity setting value has been changed so as to decrease, the gradation 414 moves toward the lower-left, as compared to FIG. 5B.

In step S326, the system control unit 50 determines whether the user has performed a touch-up. If it is determined that a touch-up has been performed by the user, the sequence moves to step S315, and if not, the sequence moves to step S321.

If it is determined in step S320 that the user has not touched the background of the coordinate system region 402 (the gradation 414), in step S327, the system control unit 50 determines whether the user has performed an operation for changing the ISO sensitivity using the predetermined operating member in the operating unit 70. If it is determined that an operation for changing the ISO sensitivity has been made, the sequence moves to step S328, and if not, the sequence returns to step S315.

In step S328, the system control unit 50 changes the ISO sensitivity setting value in accordance with the content of the operation for changing the ISO sensitivity (e.g., a direction in and amount by which the predetermined operating member has been operated). In step S329, the system control unit 50 moves the gradation 414 in accordance with the post-change ISO sensitivity setting value. In step S330, the system control unit 50 moves the display position of the linear indicator 412 in accordance with the post-change ISO sensitivity setting value.

FIG. 5B illustrates a screen displayed in the display unit 28 through the processing of steps S329 and S330, and corresponds to a result of the user performing an operation for changing the ISO sensitivity by performing an operation aside from touching the gradation 414, such as operating the predetermined operating member in the operating unit 70. As in FIG. 5A, in FIG. 5B, the position of the gradation 414 moves, but the position of the pointer 413 does not move, and thus the brightness of the background changes at the position of the pointer 413. Thus in this case as well, the user can intuitively understand that the exposure level changes due to the ISO sensitivity being changed.

Figure 6A:
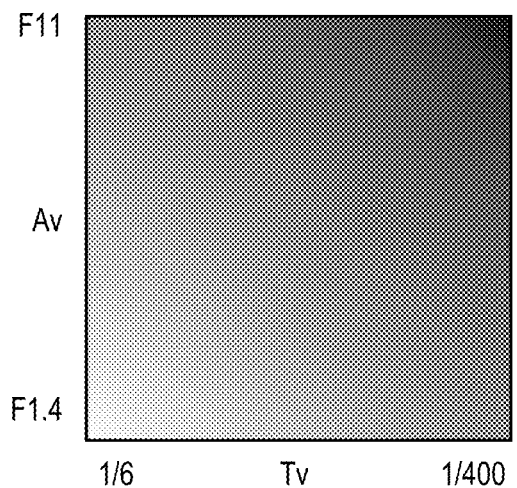
FIGS. 6A to 6C are diagrams illustrating an example of a gradation 414.
Figure 6B:
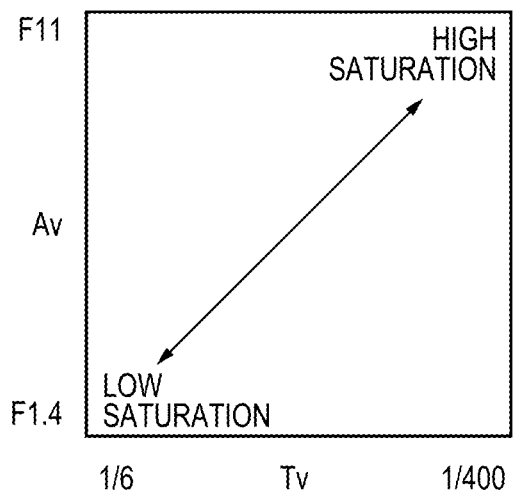
Figure 6C:
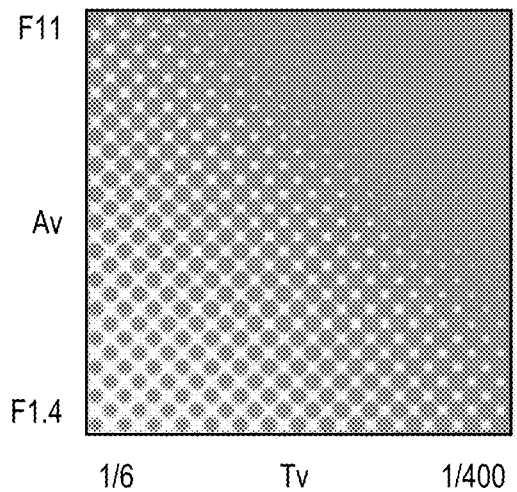

Next, an example of the visual gradation 414 in which a tone value changes in the direction from the lower-left toward the upper-right of the coordinate system region 402 (from the side where the aperture value is low and the shutter speed is slow to the side where the aperture value is high and the shutter speed is fast) will be described with reference to FIGS. 6A to 6C. FIG. 6A illustrates an example of a gradation in which the brightness changes gradually in the direction from the lower-left toward the upper-right of the coordinate system region 402. FIG. 6B illustrates an example of a gradation in which the saturation changes gradually in the direction from the lower-left toward the upper-right of the coordinate system region 402. FIG. 6C illustrates an example of a gradation, expressed by a plurality of dots, in which the dot density (the density of the dots) changes gradually in the direction from the lower-left toward the upper-right of the coordinate system region 402. Thus the gradation 414 is not limited to a specific format, and any desired visual gradation can be used.

A case where the shutter speed is automatically determined on the basis of setting values for other exposure control parameters including the ISO sensitivity, such as a case where the image capturing mode is set to an auto shutter speed mode, will be described next. In the auto shutter speed mode (a second operation mode), the aperture value setting value and the ISO sensitivity setting value can be changed independently through user operations, and the shutter speed setting value is changed automatically in response to the aperture value setting value or the ISO sensitivity setting value being changed.

Figure 7B:
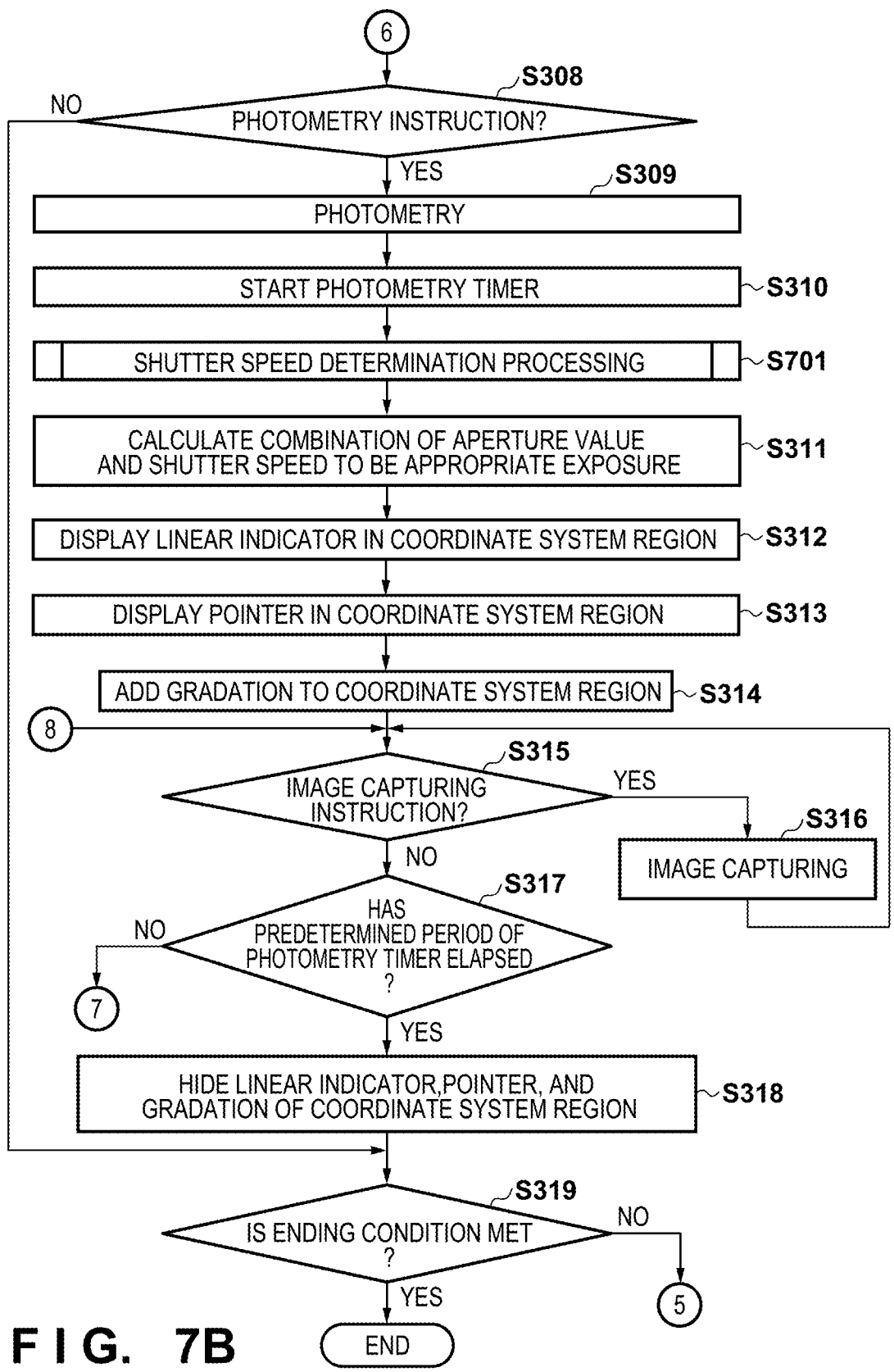
Figure 7C:
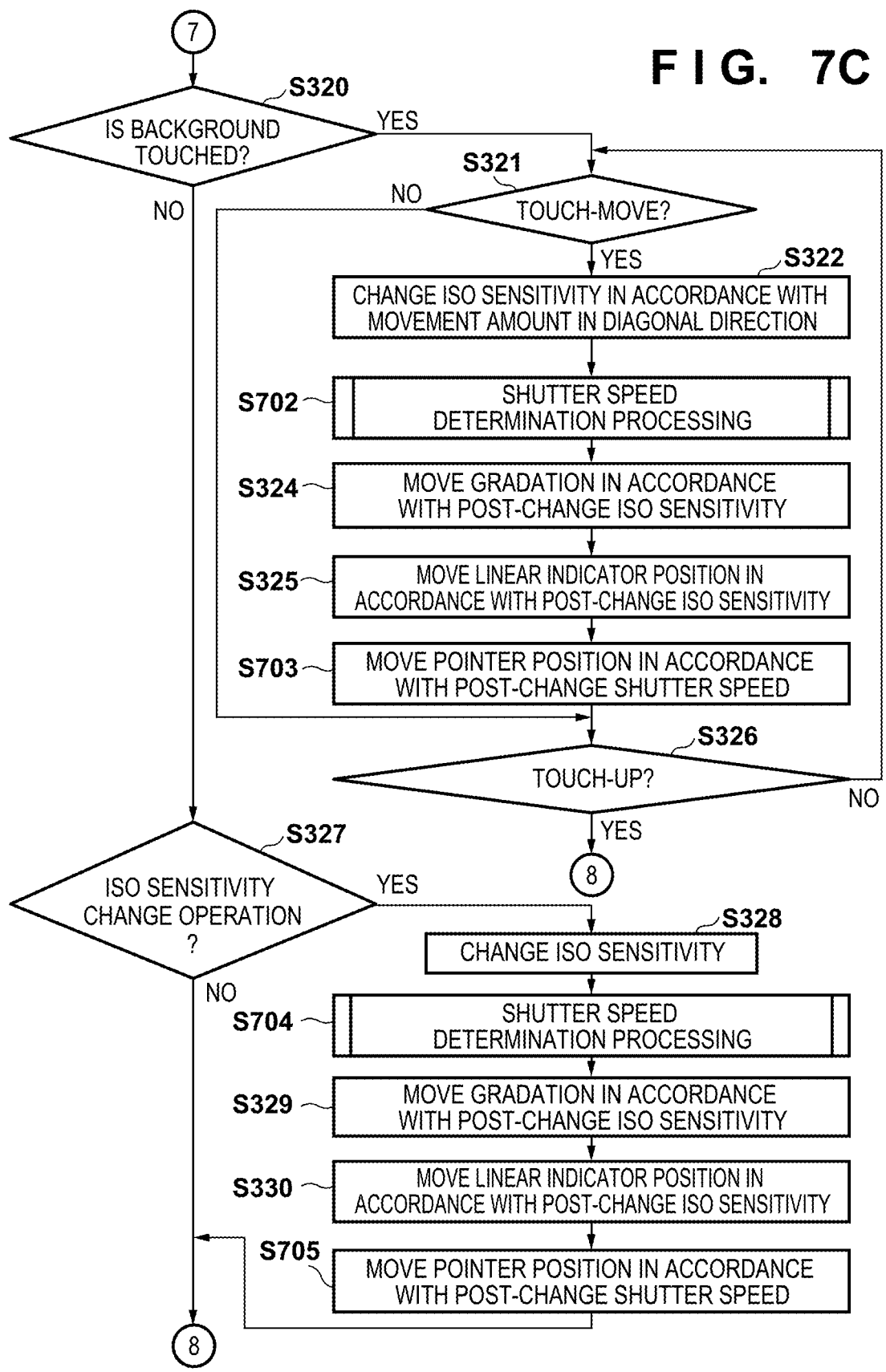

FIGS. 7A to 7C are flowcharts illustrating the flow of exposure conditions settings in the auto shutter speed mode, made using the exposure setting apparatus (digital camera 100) illustrated in FIG. 1. Unless otherwise specified, the processes in each step of these flowcharts are realized by the system control unit 50 of the digital camera 100 executing processing programs recorded in the nonvolatile memory 56 and loaded into the system memory 52. In FIGS. 7A to 7C, steps that perform processes identical or similar to those in FIGS. 3A to 3C are given the same reference numerals as in FIGS. 3A to 3C. The processing of these flowcharts starts when the digital camera 100 is powered on by the user and the image capturing mode is set to the auto shutter speed mode.

In step S701, the system control unit 50 performs processing for determining the shutter speed setting value on the basis of the currents setting values for the aperture value and the ISO sensitivity, and on the basis of the subject luminance (shutter speed determination processing).

Figure 8:
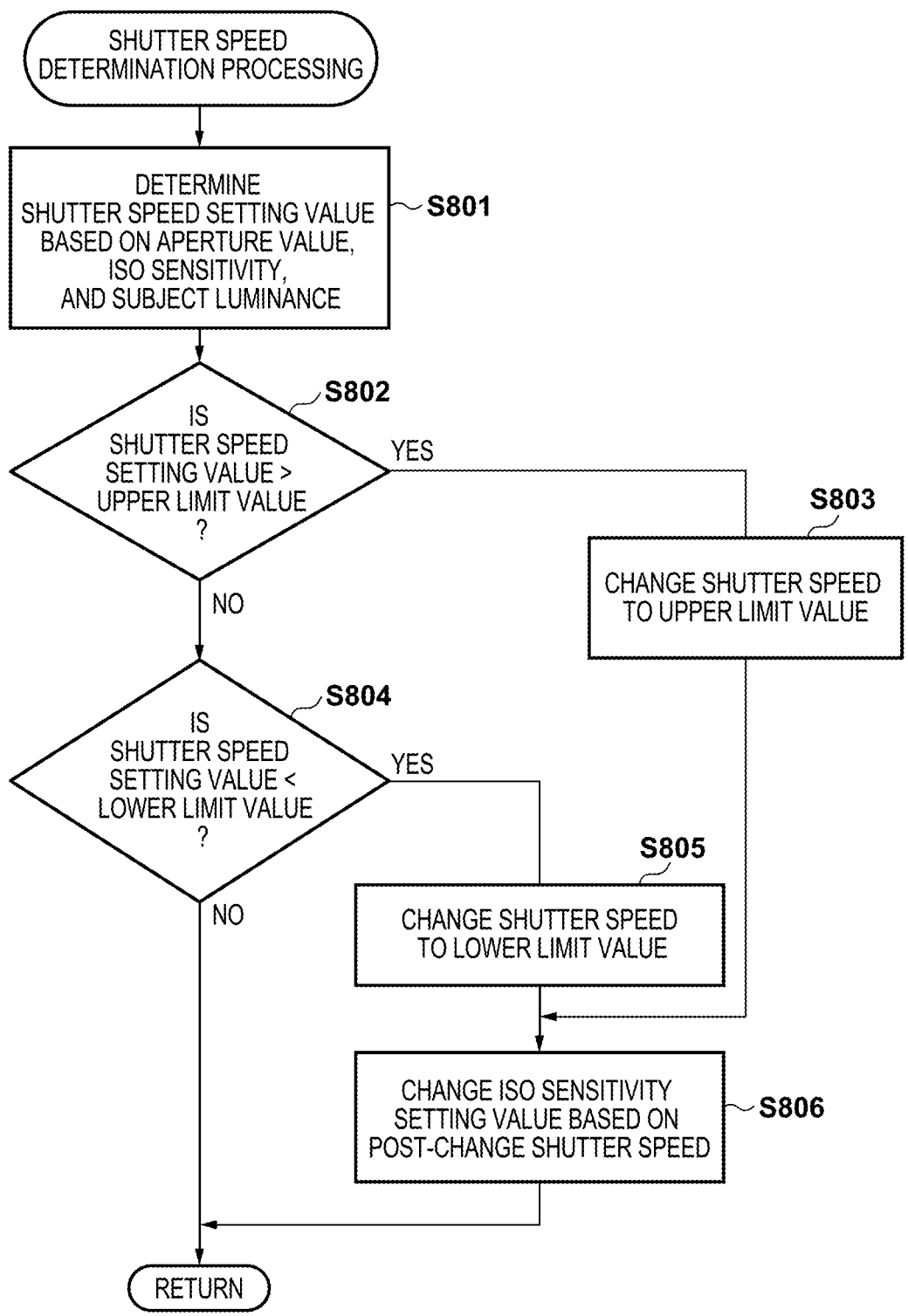
FIG. 8 is a flowchart illustrating details of shutter speed determination processing.

FIG. 8 is a flowchart illustrating details of the shutter speed determination processing. In step S801, the system control unit 50 determines the proper exposure on the basis of the ISO sensitivity setting value and the subject luminance. The system control unit 50 then determines the shutter speed setting value on the basis of the current aperture value setting value so that the combination of the aperture value setting value and shutter speed setting value correspond to the proper exposure.

In step S802, the system control unit 50 determines whether or not the determined shutter speed setting value exceeds an upper limit value for the shutter speed (e.g., 1/8000 second) defined by the specifications of the digital camera 100 (whether or not the shutter speed is faster than an upper limit value). If the determined shutter speed setting value exceeds the upper limit value, the sequence moves to step S803, where the system control unit 50 sets the shutter speed to the same value as the upper limit value. If the determined shutter speed does not exceed the upper limit value, the sequence moves to step S804.

In step S804, the system control unit 50 determines whether or not the determined shutter speed setting value is below a lower limit value for the shutter speed (e.g., 30 seconds) defined by the specifications of the digital camera 100 (whether or not the shutter speed is slower than a lower limit value). If the determined shutter speed setting value is lower than the lower limit value, the sequence moves to step S805, where the system control unit 50 sets the shutter speed to the same value as the lower limit value. If the determined shutter speed setting value is not lower than the lower limit value, the shutter speed determination processing ends.

After the processing of step S803 or step S805, in step S806, the system control unit 50 changes the ISO sensitivity setting value on the basis of the post-change shutter speed setting value so as to maintain the proper exposure. The shutter speed determination processing then ends.

The processing of steps S311 and on in FIG. 7B is carried out after the shutter speed determination processing ends. The processing of steps S311 to S314 in FIG. 7B is the same as in the case of the manual mode (steps S311 to S314 in FIG. 3B). However, the shutter speed setting value used in the case of FIG. 7B is the value automatically determined through the shutter speed determination processing illustrated in FIG. 8. Additionally, the ISO sensitivity setting value used in the case of FIG. 7B may have been changed in step S806 of FIG. 8.

The processing of steps S702 and S704 in FIG. 7C is the same as the processing in step S701 in FIG. 7B. The processing of steps S324 to S325 and S329 to S330 in FIG. 7C is the same as in the case of the manual mode (steps S324 to S325 and steps S329 to S330 in FIG. 3C). However, the ISO sensitivity setting value used in the case of FIG. 7C may have been changed in step S806 of FIG. 8.

In steps S703 and S705 in FIG. 7C, the system control unit 50 moves the display position of the pointer 413 in accordance with the post-change shutter speed setting value (the shutter speed setting value determined in step S702 or step S704). In other words, the display position of the pointer 413 after the movement indicates a position, in the coordinate system region 402, of the combination of the aperture value setting value and the post-change shutter speed setting value.

Figure 9A:
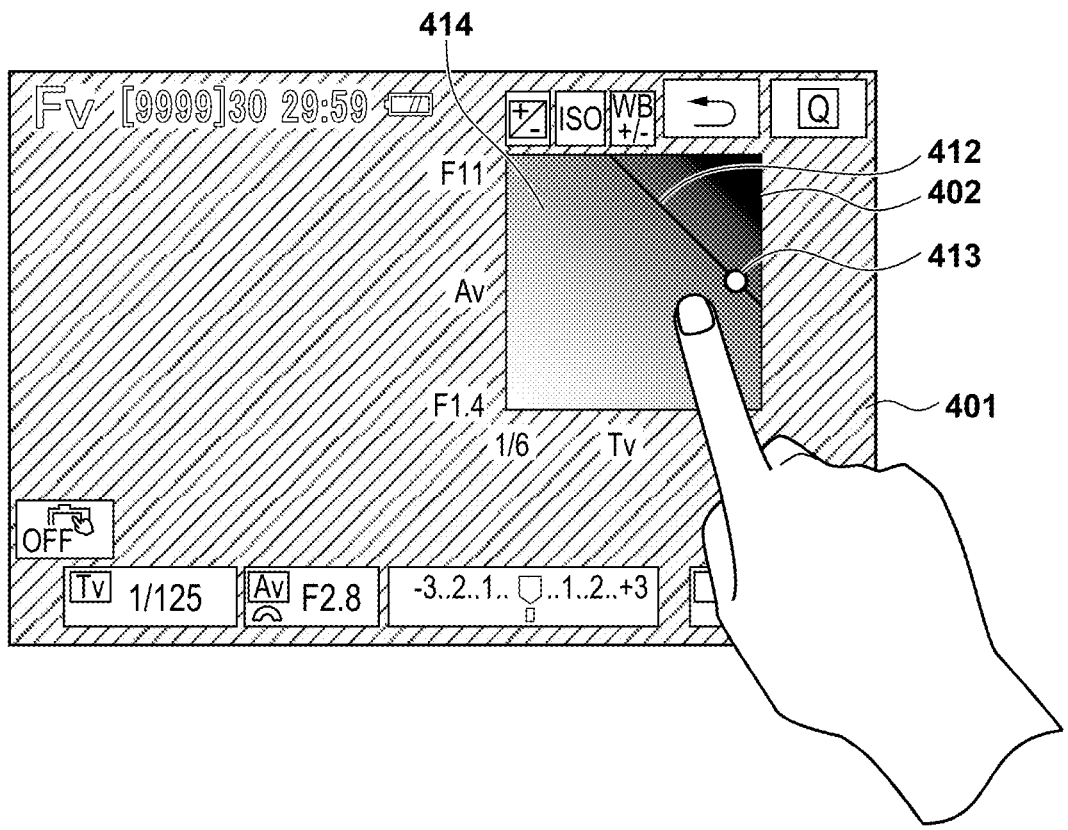
FIG. 9A is a diagram illustrating a screen displayed in the display unit 28 through the processing of steps S324, S325, and S703.

FIG. 9A illustrates a screen displayed in the display unit 28 through the processing of steps S324, S325, and S703, and corresponds to a result of the user performing an operation for changing the ISO sensitivity by performing a touch-move in the gradation 414. In this case, the position of the pointer 413 moves parallel to the horizontal axis of the coordinate system region 402 in accordance with the movement of the gradation 414. The brightness of the gradation 414 at the pre- and post-movement positions of the pointer 413 is the same. Accordingly, the user can intuitively understand that the shutter speed changes, without the exposure level changing, due to the ISO sensitivity being changed.

A situation where the user performs an operation for changing the ISO sensitivity in the auto shutter speed mode is a situation where the user wishes to reduce the shutter speed (make the shutter speed slower) while keeping the same exposure level, aperture value (depth of field), and so on, in order to take a photo in which, for example, the water of a river is flowing. A situation where the user wishes to increase the shutter speed (make the shutter speed faster) for image stabilization, shooting a moving object so that the object appears at rest, and so on also corresponds to such a situation. In such a situation, the user can graphically confirm that a desired shutter speed can be obtained by changing the ISO sensitivity, and thus the exposure conditions can be set with good operability.

Figure 9B:
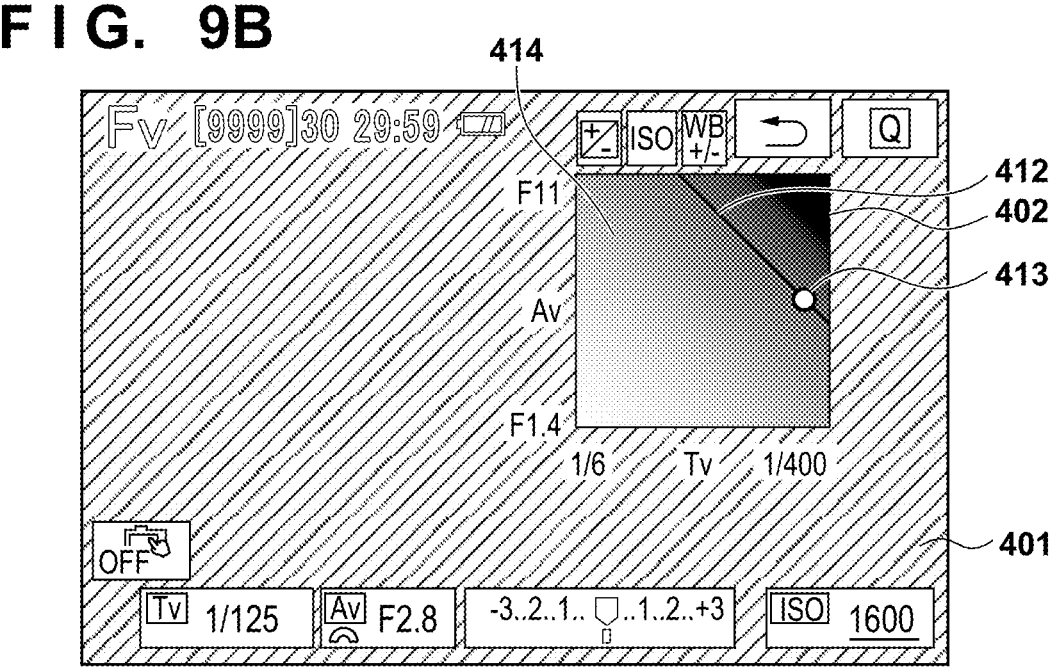
FIG. 9B is a diagram illustrating a screen displayed in the display unit 28 through the processing of steps S329, S330, and S705.

FIG. 9B illustrates a screen displayed in the display unit 28 through the processing of steps S329, S330, and S705. FIG. 9B corresponds to a result of the user performing an operation for changing the ISO sensitivity by performing an operation aside from touching the gradation 414, such as operating the predetermined operating member in the operating unit 70. In FIG. 9B as well, the position of the pointer 413 moves parallel to the horizontal axis of the coordinate system region 402 in accordance with the movement of the gradation 414, and the brightness of the gradation 414 at the at the pre- and post-movement positions of the pointer 413 is the same. Accordingly, the user can intuitively understand that the shutter speed changes, without the exposure level changing, due to the ISO sensitivity being changed.

FIGS. 7A to 9B illustrate a case of an image capturing mode in which the shutter speed is automatically determined on the basis of setting values for other exposure control parameters including the ISO sensitivity (the auto shutter speed mode). However, the present embodiment can also be applied to an image capturing mode in which the aperture value is determined automatically on the basis of setting values for other exposure control parameters including the ISO sensitivity (an auto aperture value mode). In the auto aperture value mode (a third operation mode), the shutter speed setting value and the ISO sensitivity setting value can be changed independently through user operations, and the aperture value setting value is changed automatically in response to the shutter speed setting value or the ISO sensitivity setting value being changed. In this case, "shutter speed" and "aperture value" are changed as necessary in the descriptions given with reference to FIGS. 7A to 9B. For example, in step S801 of FIG. 8, the system control unit 50 determines the aperture value setting value on the basis of the current shutter speed setting value so that the combination of the aperture value setting value and shutter speed setting value correspond to the proper exposure. Additionally, in steps S703 and S705 in FIG. 7C, the system control unit 50 moves the display position of the pointer 413 in accordance with the post-change aperture value setting value (the aperture value setting value determined in step S702 or step S704).

As described thus far, according to the first embodiment, the digital camera 100 displays the coordinate system region 402 expressing a coordinate system including a first axis corresponding to an aperture value and a second axis corresponding to a shutter speed. Then, the digital camera 100 adds, to the coordinate system region 402, the visual gradation 414 in which a tone value changes in the coordinate system region 402 in the direction from the side where the aperture value is low and the shutter speed is slow to the side where the aperture value is high and the shutter speed is fast. Through this, the user can intuitively understand a relationship which two exposure control parameters, such as aperture value and shutter speed, have with an exposure level (brightness) in a coordinate system region having two axes which correspond to the two exposure control parameters.

The foregoing describes a case where two exposure control parameters (a first exposure control parameter and a second exposure control parameter) corresponding to two axes of the coordinate system region 402 are the aperture value and the shutter speed, respectively. However, in the present embodiment, the combination of the two exposure control parameters is not limited to the aperture value and the shutter speed. For example, any two of the aperture value, the shutter speed, and the ISO sensitivity can be selected as the two exposure control parameters corresponding to the two axes in the coordinate system region 402. In this case, generally speaking, the system control unit 50 may add, to the coordinate system region, a gradation which visually expresses a difference in exposure amount based on a difference in the values of the first exposure control parameter and the second exposure control parameter at each position in the coordinate system region.

Note that various types of control that have been described above as being performed by the system control unit 50 may be performed by one item of hardware, or a plurality of items of hardware (e.g., a plurality of processors and circuits) may share processing to control the entire apparatus.

Furthermore, although the present invention has been described in detail based on its preferred embodiment, the present invention is not limited to such a specific embodiment, and the present invention encompasses a variety of modes that do not depart from the essential spirit of this invention. In addition, the foregoing embodiment merely represents one embodiment of the present invention, and different embodiments may be combined where appropriate.

Also, the foregoing embodiment has been described in relation to the case where the exposure setting apparatus is the digital camera. However, the foregoing embodiment is also applicable to, for example, an exposure measurement device that measures the brightness of a subject desired by the user and calculates preferred exposure conditions, a remote controller that remotely controls an image capturing apparatus, and so forth. The foregoing embodiment is also applicable to a digital video camera, a digital single-lens camera, a mobile information terminal, a tablet PC, a mobile telephone, and other exposure setting apparatuses that can set exposure conditions. The foregoing embodiment is further applicable to a personal computer, a PDA, a mobile telephone terminal, a mobile image viewer, a display-equipped printer apparatus, a digital picture frame, a music player, a game device, an electronic book reader, and so forth.

Also, the present invention is applicable not only to an image capturing apparatus itself, but also to a control apparatus that communicates with an image capturing apparatus (including a network camera) via wired or wireless communication and remotely controls the image capturing apparatus.

Apparatuses that remotely control an image capturing apparatus include, for example, such apparatuses as a smartphone, a tablet PC, and a desktop PC. An image capturing apparatus can be remotely controlled by a control apparatus notifying the image capturing apparatus of a command that causes various types of operations and settings to be made based on operations performed in the control apparatus and processing performed in the control apparatus. Furthermore, live-view images shot by an image capturing apparatus may be received via wired or wireless communication and displayed on a control apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147958, filed Aug. 9, 2019 which is hereby incorporated by reference herein in its entirety.

What is claimed is:

1. An exposure setting apparatus comprising at least one processor and/or at least one circuit which functions as:
a display control unit configured to perform control so that a coordinate system region which expresses a coordinate system including a first axis corresponding to an aperture value and a second axis corresponding to a shutter speed is displayed in a display unit; and
an obtaining unit configured to obtain an ISO sensitivity setting value, an aperture value setting value, and a shutter speed setting value,
wherein the display control unit performs control to add, to the coordinate system region, a visual gradation in which a tone value changes in the coordinate system region in a direction from a side where the aperture value is low and the shutter speed is slow to a side where the aperture value is high and the shutter speed is fast,
the display control unit:
controls the gradation to move to the side where the aperture value is low and the shutter speed is slow in the coordinate system region, when a user operation for reducing the ISO sensitivity setting value has been made, and
controls the gradation to move to the side where the aperture value is high and the shutter speed is fast in the coordinate system region, when a user operation for increasing the ISO sensitivity setting value has been made,
the display control unit performs control so as to display, in the display unit, an indicator indicating a position, in the coordinate system region, of a combination of the aperture value setting value and the shutter speed setting value, and
when the ISO sensitivity setting value has been changed in a second operation mode in which the aperture value setting value and the ISO sensitivity setting value can be changed independently through user operations and the shutter speed setting value is changed automatically in response to a change in the aperture value setting value or the ISO sensitivity setting value, the display control unit controls a display position of the indicator to move with the gradation so that the display position of the indicator after the movement indicates a position, in the coordinate system region, of the aperture value setting value and the changed shutter speed setting value.

2. The exposure setting apparatus according to claim 1, wherein the at least one processor and/or at least one circuit further functions as:
a detecting unit configured to detect a touch made on the display unit; and
a changing unit configured to reduce the ISO sensitivity setting value when a slide operation of a touch made on the gradation and having a movement component progressing toward the side where the aperture value is low and the shutter speed is slow in the coordinate system region has been detected, and increase the ISO sensitivity setting value when a slide operation of a touch made on the gradation and having a movement component progressing toward the side where the aperture value is high and the shutter speed is fast in the coordinate system region has been detected.

3. The exposure setting apparatus according to claim 1, wherein the obtaining unit further obtains a subject luminance, and
the display control unit performs control so as to determine a correspondence relationship which the aperture value and the shutter speed have with the tone value of the gradation on the basis of the ISO sensitivity setting value and the subject luminance.

4. The exposure setting apparatus according to claim 3, wherein the display control unit performs control so that a position in the coordinate system region which corresponds to a proper exposure determined on the basis of the ISO sensitivity setting value and the subject luminance is expressed by a half-tone of the gradation.

5. The exposure setting apparatus according to claim 1, wherein when the ISO sensitivity setting value has been changed in a first operation mode in which the aperture value setting value, the shutter speed setting value, and the ISO sensitivity setting value can be changed independently through user operations, the display control unit performs control so that a display position of the indicator does not move while the gradation moves.

6. The exposure setting apparatus according to claim 1, wherein when the ISO sensitivity setting value has been changed in a third operation mode in which the shutter speed setting value and the ISO sensitivity setting value can be changed independently through user operations and the aperture value setting value is changed automatically in response to a change in the shutter speed setting value or the ISO sensitivity setting value, the display control unit controls a display position of the indicator to move with the gradation so that the display position of the indicator after the movement indicates a position, in the coordinate system region, of the shutter speed setting value and the changed aperture value setting value.

7. The exposure setting apparatus according to claim 1, wherein the display control unit performs control to add the gradation to the coordinate system region by causing a brightness or saturation of the coordinate system region to change in the coordinate system region in the direction from the side where the aperture value is low and the shutter speed is slow to the side where the aperture value is high and the shutter speed is fast.

8. The exposure setting apparatus according to claim 1, wherein the display control unit performs control to add the gradation to the coordinate system region by displaying, in the coordinate system region, a plurality of dots so that a density of the dots changes in the coordinate system region in the direction from the side where the aperture value is low and the shutter speed is slow to the side where the aperture value is high and the shutter speed is fast.

9. A control method of an exposure setting apparatus, comprising:
performing control so that a coordinate system region which expresses a coordinate system including a first axis corresponding to an aperture value and a second axis corresponding to a shutter speed is displayed in a display unit;
obtaining an ISO sensitivity setting value, an aperture value setting value, and a shutter speed setting value;
performing control to add, to the coordinate system region, a visual gradation in which a tone value changes in the coordinate system region in a direction from a side where the aperture value is low and the shutter speed is slow to a side where the aperture value is high and the shutter speed is fast;
controlling the gradation to move to the side where the aperture value is low and the shutter speed is slow in the coordinate system region, when a user operation for reducing the ISO sensitivity setting value has been made, and controlling the gradation to move to the side where the aperture value is high and the shutter speed is fast in the coordinate system region, when a user operation for increasing the ISO sensitivity setting value has been made;
controlling to display an indicator indicating a position, in the coordinate system region, of a combination of the aperture value setting value and the shutter speed setting value, and
when the ISO sensitivity setting value has been changed in a second operation mode in which the aperture value setting value and the ISO sensitivity setting value can be changed independently through user operations and the shutter speed setting value is changed automatically in response to a change in the aperture value setting value or the ISO sensitivity setting value, controlling a display position of the indicator to move with the gradation so that the display position of the indicator after the movement indicates a position, in the coordinate system region, of the aperture value setting value and the changed shutter speed setting value.

10. A non-transitory computer-readable storage medium which stores a program for causing a computer to execute a control method comprising:
performing control so that a coordinate system region which expresses a coordinate system including a first axis corresponding to an aperture value and a second axis corresponding to a shutter speed is displayed in a display unit;
obtaining an ISO sensitivity setting value, an aperture value setting value, and a shutter speed setting value;
performing control to add, to the coordinate system region, a visual gradation in which a tone value changes in the coordinate system region in a direction from a side where the aperture value is low and the shutter speed is slow to a side where the aperture value is high and the shutter speed is fast;
controlling the gradation to move to the side where the aperture value is low and the shutter speed is slow in the coordinate system region, when a user operation for reducing the ISO sensitivity setting value has been made, and controlling the gradation to move to the side where the aperture value is high and the shutter speed is fast in the coordinate system region, when a user operation for increasing the ISO sensitivity setting value has been made;
controlling to display an indicator indicating a position, in the coordinate system region, of a combination of the aperture value setting value and the shutter speed setting value, and
when the ISO sensitivity setting value has been changed in a second operation mode in which the aperture value setting value and the ISO sensitivity setting value can be changed independently through user operations and the shutter speed setting value is changed automatically in response to a change in the aperture value setting value or the ISO sensitivity setting value, controlling a display position of the indicator to move with the gradation so that the display position of the indicator after the movement indicates a position, in the coordinate system region, of the aperture value setting value and the changed shutter speed setting value.

* * * * *